United States Patent [19]

Ahad

[11] Patent Number: 4,506,912
[45] Date of Patent: Mar. 26, 1985

[54] THREE-POINT AUTOMATIC RESTRAINT SYSTEM

[75] Inventor: Munir J. Ahad, Valencia, Calif.

[73] Assignee: American Safety Equipment Corporation, Troy, Mich.

[21] Appl. No.: 528,725

[22] Filed: Sep. 1, 1983

[51] Int. Cl.³ .............................................. B60R 21/10
[52] U.S. Cl. .................................... 280/803; 280/808; 297/474; 297/483
[58] Field of Search ....................... 280/802, 803, 808; 297/483, 474

[56] References Cited

U.S. PATENT DOCUMENTS

| | | | |
|---|---|---|---|
| 3,679,228 | 7/1972 | Settimi | 297/388 |
| 4,040,645 | 8/1977 | Giffen et al. | 280/745 |
| 4,150,843 | 4/1979 | Reid et al. | 280/744 |
| 4,168,850 | 9/1979 | Stephenson et al. | 280/803 |
| 4,180,283 | 12/1979 | Ziv | 280/802 |
| 4,189,170 | 2/1980 | Tanaka | 280/802 |
| 4,193,613 | 3/1980 | Cachia | 280/802 |
| 4,193,614 | 3/1980 | Felsing | 280/804 |
| 4,211,430 | 7/1980 | Fancy | 280/802 |
| 4,213,637 | 7/1980 | Mauron | 280/802 |
| 4,218,075 | 8/1980 | Rogers | 280/804 |
| 4,245,856 | 1/1981 | Ziv | 280/802 |
| 4,290,628 | 9/1981 | Okuyama | 280/803 |
| 4,310,178 | 1/1982 | Sato | 280/802 |
| 4,315,638 | 2/1982 | Takada | 280/803 |
| 4,315,639 | 2/1982 | Booth et al. | 280/803 |
| 4,357,035 | 2/1982 | Stamboulian | 280/804 |
| 4,423,887 | 1/1984 | Packington | 280/802 |

FOREIGN PATENT DOCUMENTS

| | | |
|---|---|---|
| 1101987 | 8/1959 | Fed. Rep. of Germany ...... 280/808 |
| 2006610 | 8/1978 | United Kingdom . |
| 2096883 | 8/1982 | United Kingdom . |

Primary Examiner—Richard A. Bertsch
Attorney, Agent, or Firm—Poms, Smith, Lande & Rose

[57] ABSTRACT

A passive safety belt system has lap and chest belts with a common connector for releasably connecting inner ends of the belts to a safety belt buckle mounted by a floor anchor strap at a position adjacent the inboard hip of a passenger, outer ends of the belts are anchored in vehicle sensitive inertia retractors mounted on the vehicle door and the lap belt is moved automatically on opening of the vehicle door by lap belt lifting means operatively connected between the vehicle door and portions of the lap belt generally adjacent the door and running to the associated door mounted retractor so that the lap belt is lifted relative the vehicle seat when the door is opened, but allowed to move to its normal position on closing of the vehicle door, the lap belt lifting means being biased to a stowed out of the way position generally adjacent the door when the door is closed.

7 Claims, 3 Drawing Figures

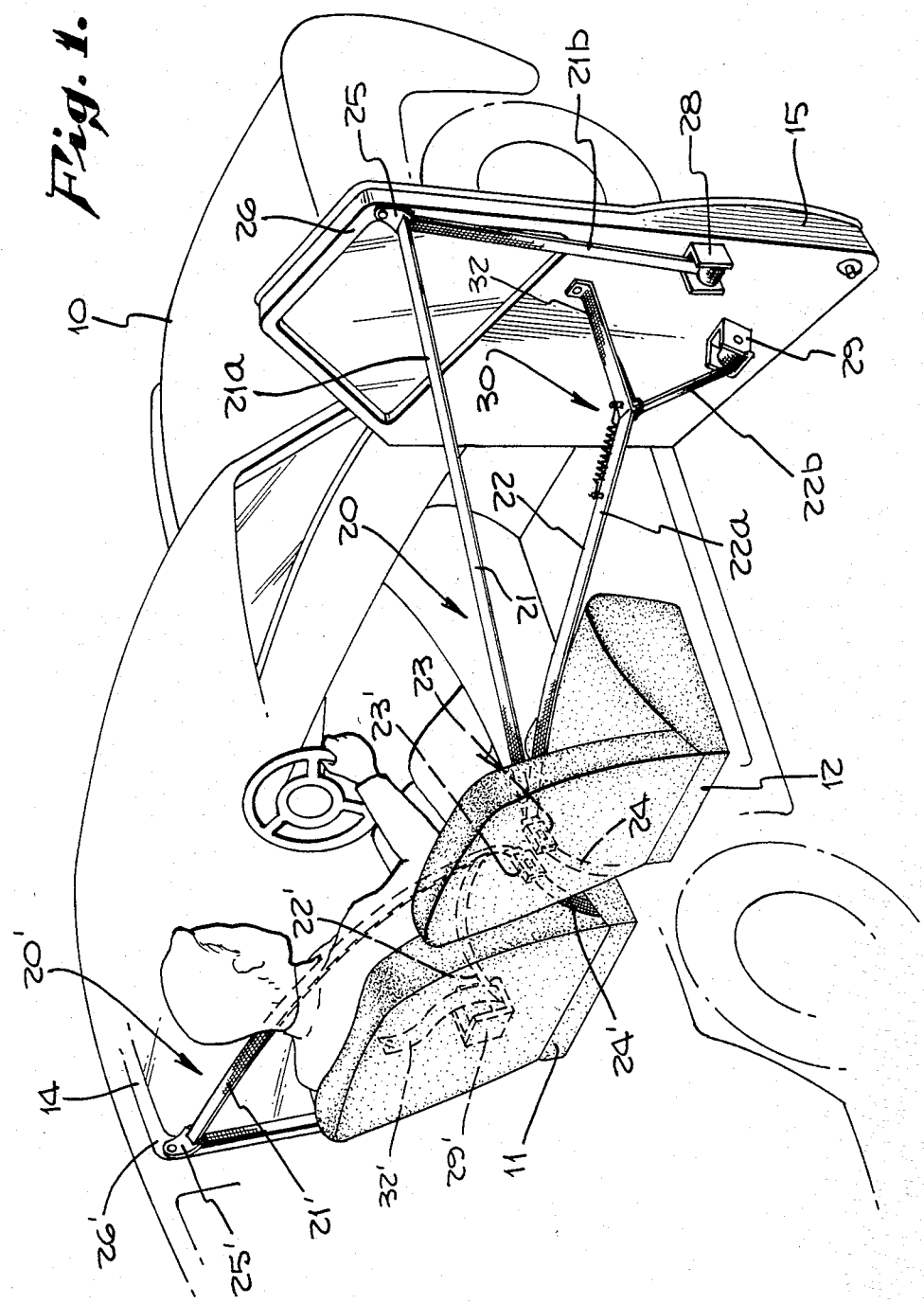

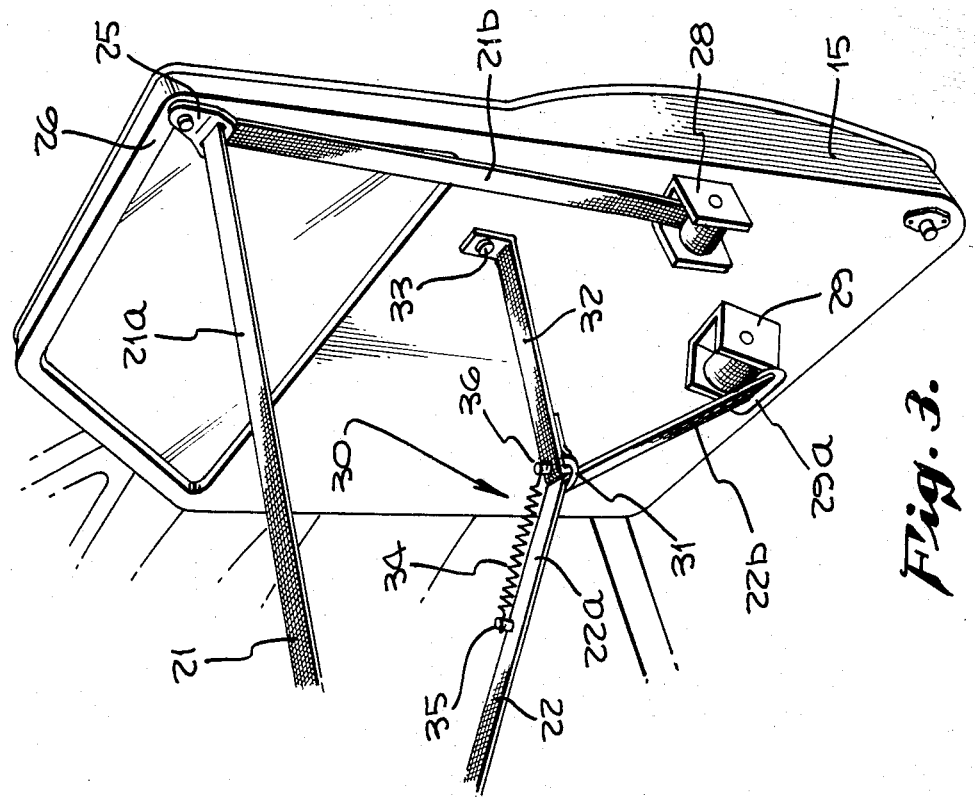
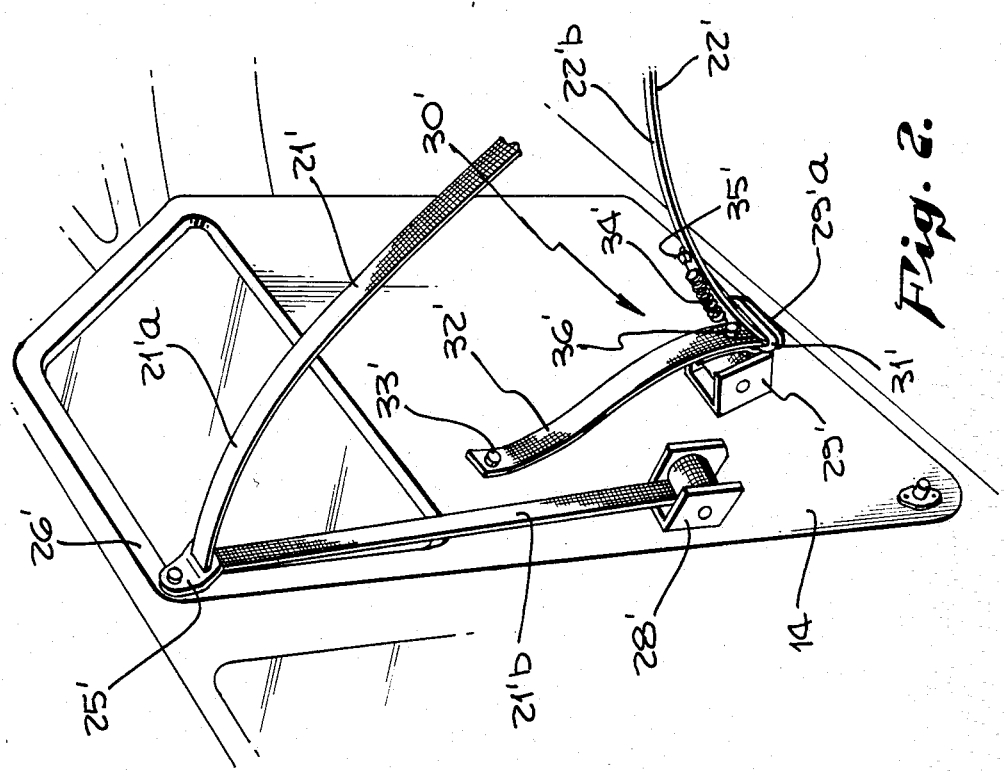

THREE-POINT AUTOMATIC RESTRAINT SYSTEM

BACKGROUND OF THE INVENTION

This invention relates in general to passive safety belt apparatus for restraining passengers in their vehicle seats during emergency conditions and, more particularly, to a three-point automatic restraint system including lap and chest belts normally connected at their inner ends to a floor anchor inboard of the vehicle seat and connected at their outer ends to webbing storage safety belt retractors mounted to the vehicle door whereby opening and closing of the vehicle door moves the belts between passenger restraint and passenger release positions.

Three-point automatic restraint systems of the general type disclosed herein are illustrated in prior patents including U.S. Pat. No. 4,189,170; 4,357,035 and 4,180,283 by way of example. In the system of U.S. Pat. No. 4,189,170, the outer ends of the safety belt are fixed to the door with mid-portions of the lap and chest belts being connected together by resilient means to facilitate positioning of the straps on opening and closing of the door. In the disclosure of U.S. Pat. No. 4,357,035 the inner end of the chest belt is mounted to an overhead track within the vehicle with the outer end of the lap belt being entrained on portions of the chest belt which runs to a door mounted anchor to provide a passive system operating in conjunction with movement of the door and the track mounted inner end of the chest belt. In U.S. Pat. No. 4,180,283, an auxiliary strap is shown mounted to the vehicle floor to facilitate modifying the direction of travel of the chest belt to hold a child safety seat in place. These prior patents are exemplary of prior passive restraint systems wherein means are provided for modifying the direction of travel of a chest or lap belt from its normal direction of travel from an inboard anchor (relative the vehicle seat) to the door mounted anchor during door opening and closing movement. Each of these references recognize that it is desirable to improve the position of the belts of the restraint system on opening and closing of the vehicle door to encourage vehicle passengers to use the safety restraint system rather than simply disconnecting it or otherwise defeating it from its intended use.

SUMMARY OF THE INVENTION

It is a primary object of the present invention to disclose an improvement in means for positioning portions of the safety belts making up a three-point automatic restraint system for vehicles so that passengers will be encouraged to utilize such systems because of their ease of use, primarily in allowing passenger entry and exit from the vehicle without hindrance from the belt when the associated belt mounting vehicle door is in an open position. More specifically, it is the primary object of the present invention to disclose a means for lifting portions of the lap belt connected between a floor anchor inboard of the vehicle seat and a door mounted anchor which is located adjacent a lower portion of the door so that when the vehicle door is opened, the passenger can easily exit from under the lap belt or enter the vehicle under the lap belt, without having to manipulate the belt unduly, by virtue of the positioning of the belt by the passenger's act of opening the vehicle door.

Generally stated, the present invention resides in the environment of a passive safety belt system having lap and chest belts with an inner end thereof releasably anchored to a floor mounted anchor inboard of the vehicle seats at a location generally adjacent the inboard hip of a passenger seated upon the vehicle seat and outer ends of the lap and chest belts being connected to door mounted anchors, the chest belt preferably running through a guide, mounted to an upper portion of the door, to a lower mounted emergency locking retractor and the lap belt preferably running to an emergency locking retractor mounted in a lower portion of the door so as to be properly positioned when the door is closed, the improvement including the provision of lap belt lifting means operable between the vehicle door and portions of the lap belt running to the associated door mounted retractor for the lap belt so that portions of the lap belt are lifted upwardly relative the vehicle seat automatically on opening of the vehicle door and operation of the lifting means so that passenger exit or entry relative the vehicle seat is facilitated without the need for disconnecting the lap belt from its respective anchors or unduly manipulating the belt by the passenger.

More specifically, the improvement in passive safety belt system of the present invention contemplates the provision of a lap belt lifting means including a lap belt guide loop means for entraining portions of the lap belt generally adjacent the associated door mounted retractor and a flexible strap means for connecting the guide loop means to a mid-portion of the vehicle door vertically spaced above the lap belt associated retractor so that on opening of the vehicle door, the door mounted strap means pulls the lap belt entrained portions via the associated loop means upwardly toward the door portion facilitating passenger entry or exit relative the vehicle seat. More specifically, bias means are provided in accordance with the present invention for biasing the flexible strap means and its associated guide loop means into an out of the way position generally adjacent the vehicle door when the vehicle door is in a closed position and outer end portions of the lap belt running through the guide loop means have been wound up upon the retractor.

It is believed that a better understanding of the present invention in three-point automatic restraint system will be afforded to those skilled in the art, and a recognition of various additional advantages and objects thereof will be attained, from the following detailed explanation of a preferred exemplary embodiment of such restraint system. Reference will be made therein to the appended sheets of drawings which will first be described briefly.

BRIEF DESCRIPTION OF THE DRAWINGS

FIG. 1 is perspective view of a preferred exemplary embodiment of three-point automatic restraint system, in accordance with the present invention, installed in both driver and passenger front seat portions of a vehicle with the system associated with the driver seat shown with the vehicle door closed and the system associated with the passenger's seat shown with the door opened.

FIG. 2 is an enlarged detail view of the three-point automatic restraint system associated with the driver seat of the embodiment of FIG. 1.

FIG. 3 is an enlarged detail view of the three-point automatic restraint system of FIG. 1 associated with the passenger's door in opened position.

DETAILED DESCRIPTION OF PREFERRED EMBODIMENT

Referring now initially to FIG. 1, a conventional motor vehicle 10 is illustrated having a driver seat 11 and passenger's seat 12 positioned on the vehicle floor inside the vehicle and adjacent the driver's door 14 and passenger's door 15. A three-point automatic retraint system, in accordance with the present invention, is illustrated generally at 20 in association with the passenger seat 12 and passenger vehicle door 15, which is in the open position, while an identical retraint system, indicated generally at 20' is shown in association with the vehicle driver seat 11 and driver's door 14, the driver's door being in closed position.

The exemplary embodiment of restraint systems 20, 20' each include a chest belt 21, 21' and a lap belt 22, 22'. As is customary in passive restraint systems, the inner or inboard ends of the chest and lap belts are secured to floor anchors inboard of the vehicle seats. In the exemplary embodiment, the respective belts 21, 22 of the passenger system indicated generally at 20, and the belts 21' and 22' of the driver's system indicated generally at 20' are connected that their inner ends to a common anchor which in the exemplary embodiment comprises safety belt buckles 23, 23' which in turn are mounted to floor anchored straps 24, 24' so that the buckles are positioned in use generally adjacent the inboard hip of the passenger.

As is also customary in passive restraint systems, the chest belt 21, 21' of the exemplary embodiment is entrained in a strap guide 25, 25' mounted to an upper portion of the vehicle door 26, 26' and is retractable on and anchored by a door mounted vehicle sensitive inertia retractor 28. As can be seen in FIG. 1, when the vehicle door is opened, the chest belt 21 unwinds from retractor 28 with the portion 21a extending from the inboard side of the passenger seat to the guide 25 adjacent an upper portion of the door providing ample clearance for the passenger to exit from and enter into the vehicle. Belt portion 21b is held adjacent the door in an out of the way position as the belt winds and unwinds form the retractor 28.

The outer end of the lap belt 22 is typically secured to the vehicle door by a vehicle sensitive inertia retractor, as retractors 29 and 29' in the exemplary embodiment with the retractor being mounted adjacent a lower portion of the vehicle door so that, when the door is in a closed position as seen in FIG. 2, the lap belt will be wound from its inboard anchor position adjacent the passengers inboard hip to the retractor which is positioned generally adjacent and below the passenger's outboard hip. In such an arrangement, without utilization of the improvement of the present invention, the lap belt could be positioned in a position interfering with passenger exit from and entry into the vehicle when the vehicle door is in an opened position. As is particularly contemplated within the present invention, lap belt lifting and guide means, indicated generally at 30, are provided for lifting the lap belt upwardly relative the passenger seat to facilitate a passenger entering or leaving the vehicle without the need for releasing the inboard anchor means 23, 23'.

As seen in general in FIG. 1, and more specifically in FIGS. 2 and 3, the exemplary lap belt lifting and guide means, indicated generally at 30, are provided in accordance with the present invention in association with the vehicle door and portions of the lap belt running to the door mounted retractor to lift the lap belt to a passenger release position when the door is in a opened position as seen in FIGS. 1 and 3 with regard to the passenger seat and door. As will be discussed more fully hereinafter, such lifting and guide means are also provided, in accordance with the present invention, so as to be in a stowed, out of the way or inactive position when the vehicle door is closed as seen in FIG. 2 with regard to the driver's door.

The exemplary embodiment of lap belt lifting and guide means, indicated generally at 30, further includes the provision of a guide loop, which may be of metal or plastic since it is a non-load bearing member through which the lap belt 22 is entrained with lap belt portions 22a inboard of loop 31 and portions 22b being outboard of loop 31 when the door is in the opened position of FIG. 3. A guide strap 32 of flexible material, which may be of similar construction to the safety belt webbing for belts 21 and 22, is connnected at its outer end by anchor bolt 33 to a midportion of the vehicle door, generally just below the window frame of the door, and has its inner end turned through loop 31 and sewn upon itself to secure the loop permanently to strap 32. From the foregoing, it can be seen that when the vehicle door is opened as seen in FIG. 3, the lap belt 22 being anchored at its inner end at buckle anchor 23 will unwind from retractor 29 with the spring tension of the retractor trying to straighten belt sections 22a and 22b against the restraint of the exemplary belt lifting means provided by the strap 32 and belt entraining loop 31.

As is also contemplated within the present invention, it is desired that the strap 32 and guide loop 31 of the belt lifting means of the present invention be stowed or held in an out of the way position generally adjacent the vehicle door in a noninterferring, inoperative mode when the vehicle door is closed. Such position is illustrated in FIG. 2 where the strap 32' and its associated guide loop 31' are shown lying generally adjacent the vehicle door lying over portions of the exemplary retractor 29'. This positioning of the lifting strap and guide loop is insured through the provision of biasing means for biasing the loop 31 and associated inner end of strap 32 toward the retractor web guide 29a of FIG. 3 and 29'a of FIG. 2. In the exemplary embodiment, such bias means include the provision of a bias spring 34, 34' which has a first end connected by a mounting post 35, 35' to belt portions 22a, 22'a normally inboard of loop 31 during belt retractive movements between door opened and closed positions with the opposite spring end connected to anchor post 36 secured to the inner end of strap 32 adjacent loop 31. As seen in FIG. 3, when the door is opened, spring 34 is stretched within its elastic limit due to movement of lap belt 22 in an unwinding manner relative retractor 29 which causes spring mounting post 35 to move away from loop 31. However, on closing of the vehicle door to the position of FIG. 2, the lap belt mounted post 35 is drawn toward the retractor 29 and spring 34 draws post 36 and the associated end of strap 32 toward post 35 and thus toward a position adjacent the retractor as seen in FIG. 2.

It should therefore now be apparent to those skilled in the art from a consideration of the foregoing detailed description of a preferred exemplary embodiment of the present invention in three-point automatic restraint system, that the within restraint system has been improved by the within lap belt lifting and guide means to provide an overall more usable system facilitating ease of entry and exit for the passenger without disconnecting the lap or chest belts so that the use of the safety belt system by the vehicle driver and passenger is promoted. The passenger need merely open or close the vehicle door to operate the system and the lap belt, as well as the chest belt, is moved to a position facilitating passenger or driver entry or exit relative to the vehicle without additional manipulative action by the passenger or driver and without the need for automated tracks or pulleys moving portions of the strap along expensive and complicated tracks associated with the vehicle roof or door.

Having thus described a preferred exemplary embodiment of the present invention in three-point automatic restraint system, those skilled in the art should realize that there are various modifications, adaptations and alternatives to the present embodiment which come within the scope of the present invention which is defined by the following claims.

I claim:

1. The improvement in a passive safety belt system having lap and chest belts with a common anchor for their inner ends at a location inboard of the associated vehicle seat and their respective outer ends anchored to the vehicle door whereby the chest and lap belts are moved automatically between a passenger restraint position when the door is closed and a passenger release position when the door is opened due to door movement, the door anchor for said lap belt including an emergency locking safety belt retractor mounted to a lower portion of the door, the improvement comprising the provision of:

lap belt lifting means including a flexible strap means of safety belt webbing operably connected between the vehicle door and portions of the lap belt running to the associated door mounted retractor for lifting the lap belt upwardly relative the vehicle seat overcoming the belt rewind bias for said retractor on said lap belt to facilitate passenger exit and entry relative the vehicle seat without the need for disconnecting the lap belt from its inboard anchor.

2. The improvement in passive safety belt system of claim 1 wherein said lap belt lifting means comprises:

bias means for biasing an end of said strap means adjacent said loop means to a predetermined location on said lap belt whereby on closing of said vehicle door and retraction of said lap belt onto said retractor, said predetermined location on said lap belt is placed outwardly and adjacent said retractor and said strap means is thereby biased into an inactive, out of the way position lying generally adjacent said vehicle door.

3. The improvement of a passive safety belt system having lap and chest belts with a common anchor for their inner ends at a location inboard of the associated vehicle seat and their respective outer ends anchored to the vehicle door whereby the chest and lap belts are moved automatically between a passenger retraint position when the door is closed and a passenger release position when the door is opened due to door movement, the door anchor for said lap belt including an emergency locking safety belt retractor mounted to a lower portion of the door, and lap belt lifting means operable between the vehicle door and portions of the lap belt running to the associated door mounted retractor for lifting the lap belt upwardly relative the vehicle seat to facilitate passenger exit and entry relative the vehicle seat without the need for disconnecting the lap belt from its inboard anchor, wherein said lap belt lifting means comprises:

a strap guide loop means for entraining portions of said lap belt generally adjacent said associated door mounted retractor; and flexible non-extendable strap means for connecting said guide loop means to a portion of the vehicle door vertically spaced above said retractor at a mid-portion of said door, whereby an opening of said door, said door mounted strap means pulls said lap belt portions entrained through said loop means upwardly toward said door mid-portion overcoming a belt rewind bias of said retractor on said lap belt.

4. The improvement in passive safety belt system of claim 3 wherein said lap belt lifting means comprises:

bias means for biasing an end of said strap means adjacent said loop means to a predetermined location on said lap belt whereby on closing of said vehicle door and retraction of said lap belt onto said retractor, said predetermined location on said lap belt is placed outwardly and adjacent said retractor and said strap means is thereby biased into an inactive, out of the way position lying generally adjacent said vehicle door.

5. The improvement in a safety belt restraint apparatus having three anchor points for restraining vehicle passengers in their seats upon vehicle deceleration, said apparatus having a lap belt having one end anchored on the vehicle door via a door anchor and a second end releasably anchored to a vehicle floor mounted anchor inboard of the passengers seat and a chest belt having one end anchored on the vehicle door, a center portion entrained in a door frame mounted guide wherein said guide is mounted adjacent an upper portion of the door, and a second end releasably anchored to said floor mounted anchor inboard of the passenger seat, the improvement comprising the provision of:

lap belt guide means including a flexible strap of safety belt webbing mounted at one end on said vehicle door vertically spaced above said door anchor for said lap belt and connected at an opposite end to said lap belt for elevating portions of said lap belt adjacent said door when said door is opened to facilitate exit and entry of passengers under said lap belt while it is connected to both said floor mounted anchor and to said vehicle door by said door anchor, said guide means strap lifting said lap belt overcoming a belt rewind bias of said retractor.

6. The improvement in a safety belt restraint apparatus having three anchor points for restraining vehicle passengers in their seats upon vehicle deceleration, said apparatus having a lap belt having one end anchored on the vehicle door via a door anchor and a second end releasably anchored to a vehicle floor mounted anchor inboard of the passengers seat and a chest belt having one end anchored on the vehicle door, a center portion entrained in a door frame mounted guide wherein said guide is mounted adjacent an upper portion of the door, and a second end releasably anchored to said floor mounted anchor inboard of the passenger seat, and lap belt guide means mounted on said vehicle door vertically spaced above said door anchor for said lap belt for elevating portions of said lap belt adjacent said door when said door is opened to facilitate exit and entry of passengers under said lap belt while it is connected to both said floor mounted anchor and to said vehicle door by said door anchor, wherein said lap belt guide means comprises:

flexible non-extendable connector means mounted between portions of said lap belt and said vehicle door and biasing means for biasing said flexible connector means to a position generally adjacent said door when said door is in a closed position.

7. The improvement in safety belt restraint apparatus of claim 6 wherein said lap belt guide means comprises:

a flexible strap connected at one end to a mid-portion of said vehicle door and having a belt entraining means at its opposite end receiving portions of said lap belt therethrough.

* * * * *